United States Patent
Petit

[11] 3,722,747
[45] Mar. 27, 1973

[54] SILO DISCHARGE CONTROL

[76] Inventor: Georges Petit, 10, avenue de Salonique, Paris, France

[22] Filed: Nov. 19, 1971

[21] Appl. No.: 200,634

Related U.S. Application Data

[63] Continuation of Ser. No. 842,545, July 17, 1969, abandoned.

[30] Foreign Application Priority Data

July 24, 1968 France.............................68160406

[52] U.S. Cl. ...................222/56, 222/198, 222/200, 222/227
[51] Int. Cl............................................B65g 67/56
[58] Field of Search .....214/17, 17 D; 193/2; 198/59, 198/60; 222/161, 198, 200, 202, 203, 415, 564, 56, 227

[56] References Cited

UNITED STATES PATENTS

| | | | |
|---|---|---|---|
| 1,234,532 | 7/1917 | Dickerson | ..........................222/415 |
| 3,081,009 | 3/1963 | Cooper | ..............................222/564 X |
| 3,257,040 | 6/1966 | Dumbaugh et al. | ...................222/161 |

FOREIGN PATENTS OR APPLICATIONS 1,368,711   6/1964   France ...............................222/415

*Primary Examiner*—Robert G. Sheridan
*Attorney*—Breitenfeld & Levine

[57] ABSTRACT

This specification discloses a silo suitable for granulated or powder form materials. The silo of the invention comprises a fixed shaft, at least one transfer assembly situated below said shaft and an extractor disposed beneath said transfer assembly. The silo shaft has a convergent hopper in its lower portion and there is an outlet opening in the hopper which provides for free flow of material.

At least one decompression hopper is situated in the transfer assembly and is elastically suspended so as to be displaceable in all directions relative to the silo shaft and the extractor. In this way, products leaving the silo form a constantly renewed slope at the rear end of the active part of said extractor.

9 Claims, 33 Drawing Figures

INVENTOR:
GEORGES PETIT

By
Breitenfeld & Levine
ATTORNEYS

INVENTOR:
GEORGES PETIT
By
Breitenfeld & Levine
ATTORNEYS

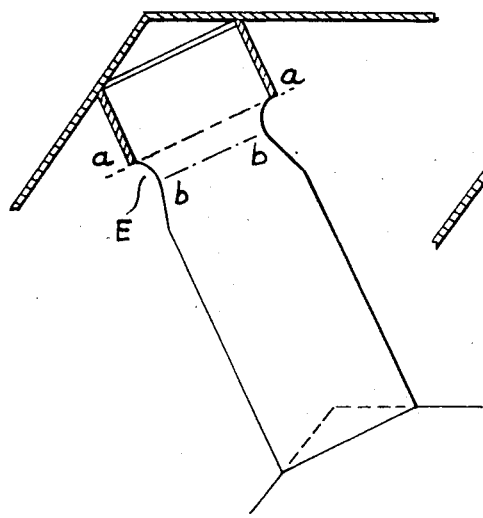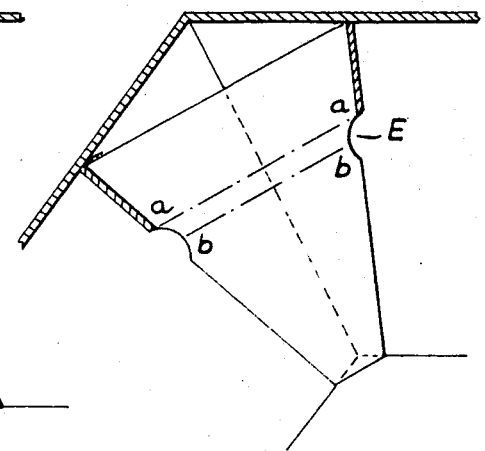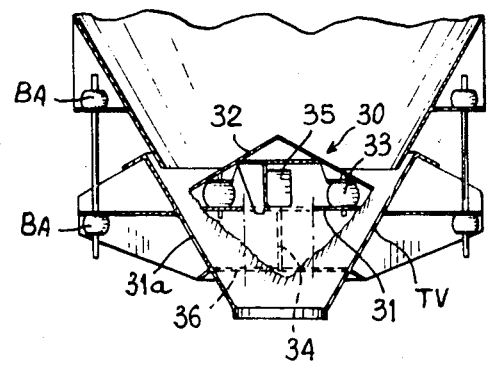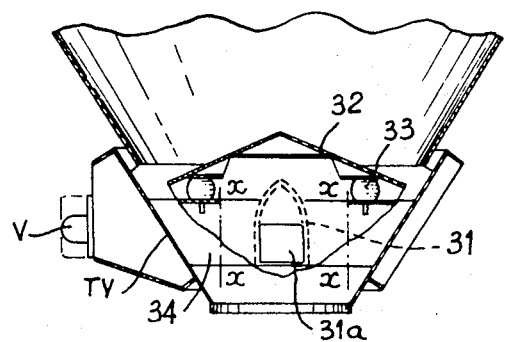

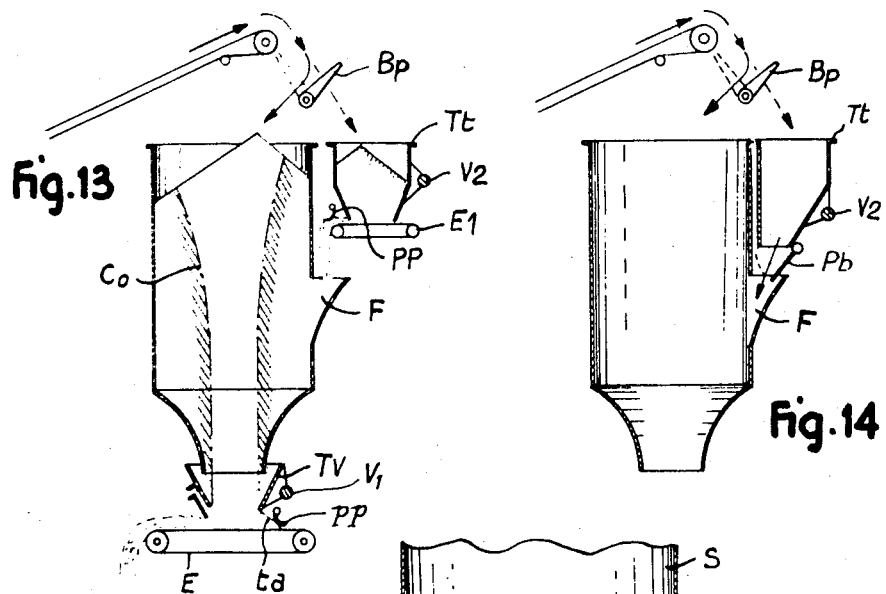
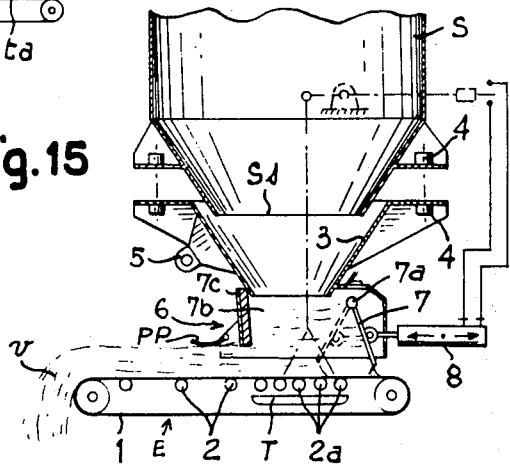
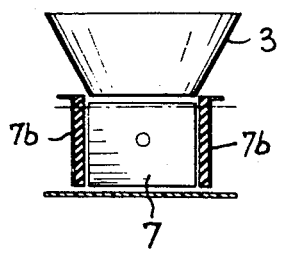
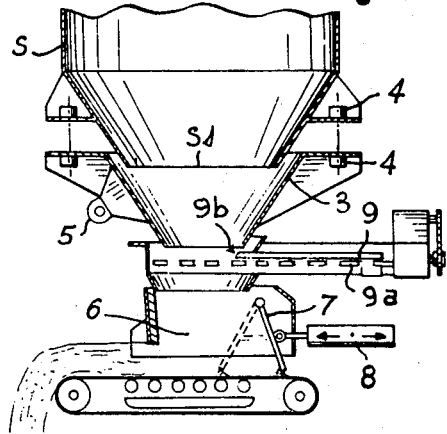

INVENTOR:
GEORGES PETIT

SILO DISCHARGE CONTROL

This application is a continuation of application Ser. No. 842,545, filed July 17, 1969, now abandoned.

The present invention relates to the extraction system of silos, hoppers and the like.

In his U.S. Pat. No. 3,593,892, the applicant, after having referred to the two most usual procedures for avoiding the formation of arches or considerable dead stocks in the silos, namely, firstly the particulars of the internal construction of the silo and secondly the use of vibrations has proposed various improvements, particularly as regards the shape, structure and internal geometry of the silos, with the object of promoting the flow of all of the dead stocks.

In the aforesaid application, the Applicant indicated the essential procedures with the object of improving the silos in their upper portion, comprising the body prolonged by at least one hopper, these elements being fixed (not vibrated). He pointed out that the lower flow orifice forming the outlet of this upper part should be at least equal to the section of natural automatic flow.

Throughout the following specification, this orifice or opening, to be chosen in a manner known per se as regards optimum dimensions, will be called the "outlet."

The present invention is concerned with the assembly of the devices to be interposed between the aforesaid "outlet" and the system used for evacuating materials leaving the silo and generally called "extractor," with the object of improving the flow and the extraction of all the mass in the silo and thus of avoiding the stagnation and the segregation, which are phenomena strictly connected with the quality of the flow which is achieved.

This assembly of devices will advantageously operate in connection with the devices which have formed the subject of the foregoing patent application as already referred to and with the complementary devices defined by the present patent application and which are to be provided in other zones of the silo, so that their essential and concurrent action permits the aforesaid objects to be achieved: total flow without stagnation and without segregation. Although numerous types of known extractors can be used, a conveyor belt guided over rollers will be most frequently employed, the materials from the silo reaching this belt in a predetermined zone which is called the "extraction zone," the movement of the belt carrying the materials from the silo at a transfer speed adapted to the desired outlet flow of the materials.

One of the essential problems of the extraction is due to the fact that, very generally, the "outlet" which is necessary is much larger than the extraction zone of the extractor: by way of example, when the "outlet" has a diameter of several meters, it is clearly impossible, or prohibitive on cost grounds, to use in practice a conveyor belt or any other extractor of also a large width. Consequently, in order to be able to use extractors of relatively normal dimensions, which are conventional and are not prohibitive as regards cost, it is necessary to interpose between the "outlet" and the extracting belt a transfer assembly with a convergent effect, in order to channel the materials of the silo towards the extractor, with a flow opening which decreases from top to bottom.

The conventional procedure is to use for this purpose a hopper which converges downwardly or an assembly of successive hoppers having the overall effect of convergence. It is quite evident that, in such a transfer assembly, the most marked phenomena of arches and progressive clogging have a tendency to be produced.

The conventional solutions used for overcoming these phenomena are generally based on the use of the vibration of one or more hoppers and/or of one or more intermediate members of the assembly, the vibrations then either being continuous or cyclic according to a program, but in every case with a constant vibrator force (although this is frequently adjustable). Experience shows that these solutions, which generally are not very efficient, are usually dangerous: or them compress and compact the material, or they are insufficient, or they damage the silos and hoppers. These bad results are readily understood, since the vibratory force being used is not constantly adapted to the variations in the flowability of the product in question.

One of the more complicated of the conventional solutions consists, for example, in making the state of vibration of certain elements dependent on the pressure of the stream of material at the level of the extractor: when a fall in pressure is detected, it is probable that there is a clogging in the transfer system ahead of the extractor and the vibration is initiated in the penultimate hopper (the last hopper being that which feeds the extractor element and usually called the supply chute) in order to produce a declogging. It is however apparent that this is a palliative rather than a truly efficient remedy: in actual fact, if there is any clogging, it is because the geometry of the transfer assembly is not adapted at every moment to the characteristics forming the "pourability" of the material.

Furthermore, experience shows that the decrease in the pressure detected at the level of the extractor usually rather indicates a clogging of the last hopper or chute rather than of the penultimate hopper, particularly as regards products which are fairly clogging by nature.

The Applicant has found that the clogging effects are formed from the last lower surface capable of providing a support for a deposit (in principle, the last inclined surface or surfaces before the extractor element), and then are developed by successive deposits in stratified layers and progressively reach the top parts of the silo.

It is thus pointless under such conditions to vibrate the penultimate hopper, because the pressure liberated by the vibration attempts to engulf an excess of material in the hopper of the extractor, when this latter has precisely just given signs of clogging on starting up the vibration. The result thereof will be an acceleration of the deposits and of the duration thereof inside the last hopper; the residual passage becomes progressively more closed, causing vibrations of greater frequency until there is complete stoppage, which necessitates manual intervention.

On the other hand, the integral automatic procedure cannot be satisfied by a constant vibratory force when the flowability is a large variable. The vibratory force, if it is well adapted to certain moments, is decidedly less adapted to others and is the cause of difficulties.

The pourability of a granular or pulverous product depends on numerous factors among which can be mentioned the grain size, the water content and, more generally, the more or less homogeneous composition of the product. In practice, not only the industrial products stored in silos show great differences from one another as regards pourability, but the same product can itself vary considerably in its pouring capacity: for example, its pouring capacity can vary enormously between summer (dry product) and winter (moist product); furthermore, the pourability can be influenced by the previous handling operations on the product, which can for example produce locally compacting effects; finally, the wide variety of industrial products, especially those originating from extraction from pits or mines, for example clays, limestones, marls, coals and ores, are far from being homogeneous.

On the other hand, the process referred to above (line 23 on page 2) and providing for vibration of the penultimate hopper (or those in front thereof) is found in practice to be unsatisfactory, because it produces without fail the progressive clogging of the last hopper or chute (which is generally that of the extractor itself), because of the truly cramming effect which this latter experiences because of the excess delivery of material liberated by the vibration and by the unclogging of the penultimate hopper.

The present invention provides for overcoming the disadvantages briefly referred to above in connection with the conventional transfer assemblies interposed between the outlet of a silo and its extractor.

According to a first feature, the transfer assembly according to the invention comprises one or more decompression hoppers suspended in a very flexible and elastic manner and so as to be very mobile, in order to permit easy displacements both in the vertical direction and in any horizontal direction; these possibilities of easy displacements have a very marked auto-destructive effect on chimneys, stagnations and arches. Furthermore, the decompression hoppers according to the invention advantageously have particular structural features and also complementary features, these being inter alia the extraction with a rear incline and the extraction section of progressive widths or of parabolic form, which facilitates in conjunction with the other aforesaid means the complete mobilization of the mass of the stored product the whole being associated if necessary with an anti-clogging lining.

According to another feature of the invention, the different hoppers of the transfer assembly are capable of being set in vibration in accordance with specific vibratory procedures, of which one of the main characteristics is that they intervene at an appropriate moment with possibility of adaptation of the vibratory force being used, this being contrary to the general nature of the aforementioned processes, which intervene in a blind and constant manner, either permanently or cyclically.

In contrast to these latter, the vibration procedure proposed here, which shows a certain degree of intelligence permitting it to discern the best moment and the necessary intensity for the vibration and the good position for its operation, can thus be qualified as vibration brought into use "intelligently."

Moreover, these intelligent vibratory procedures can have progressive effects and comprise a cyclic declogging program.

It is to be noted that the intelligence vibratory procedures described above can be applied to all the other declogging arrangements, such as inflating cushions, fluidification, rotary air jets, etc., in order to make them more efficient and less troublesome.

According to another feature of the invention, the hopper of the decompression assembly has associated therewith a compression board in the form of a cone or pyramid, which is preferably elastically and movably mounted axially of the hopper; this board is advantageously accessible each time when possible from outside the hopper and is associated with an independent vibratory system.

According to another feature of the invention, vibrations which are adjustable in amplitude and/or frequency are used, the adjustment being effected in accordance with the instantaneous characteristics of the flow in the silo.

According to another feature of the invention, a particular process of "excess withdrawal with overflow" is used for the products which clog together and form masses.

By massing products, there are indicated here those which are capable of setting if they remain stationary for too long a period.

This phenomenon frequently occurs with hygroscopic products, as for example the nitrates, chlorides, etc., which are used in the manufacture of chemical fertilizers and which can become solid in a few hours.

According to another feature of the invention, used in the case of products having very variable flowing capacity, the compacting in the transfer assembly is anticipated by permanently adjusting the flow aperture of the transfer assembly or extraction zone to the instantaneous flowability of the product which is passing through it. Therefore, it is not the clogging which is acted upon, this only being a consequence, but it is the actual reason for this phenomena which is affected, this being the lack of adaptation of the transfer assembly to the flowing properties of the product.

Consequently, according to the invention, for the products which have a very variable flowability, it is proposed to interpose an intermediate transfer assembly between the "outlet" and the extractor device, of whatever type this may be, such as an extractor comprising a belt, blades, plates, chain, of the Redler or other type, or having a single or multiple screw or a vibrating trough, etc., comprising at least one hopper which converges downwardly and is capable of being set in vibration, preferably intelligently, and below this hopper, at least one opening control section of variable passage and means which adapt the opening of the control section to the instantaneous load of the extractor.

In a first embodiment, the control section is formed by a hopper comprising a movable inclined face suspended from a horizontal shaft.

In other embodiments, the control section comprises at least one horizontally displaceable, motor-driven register which forms the adjustable member determining the opening of the control section.

The load of the extractor can be determined in several ways. It is possible, as known per se, to associate with the extractor a weighing table which determines the variations in weight of the products on the feeding zone of the extractor. It is also possible to determine the variations in the height of the stream of product discharged by the extractor in the vicinity of the feeding zone or the variations of the "rear incline," to which reference will be made later.

According to another feature of the invention, there is used in combination with the above devices, in the case of large silos having several outlets or a single and very elongated outlet in the direction of extraction, a method of extraction having several sills or shelfs which are adjustable, even during the extracting operation, and advantageously using the methods of extraction comprising a complementary action with "rear slope" and with a progressive extraction section.

According to another feature of the invention, all or some of the above arrangements are used for achieving:

a. The extraction from fine powder silos without fluidization and without air consumption. This is always advantageous, because the compressed air is always very costly to produce and store (particularly if much of it is consumed and if it is wanted in a dry and clean state, like "instrument air"). Furthermore, the use of air is undesirable for certain products, such as: powdered coal or coke (dangers of explosions) or cement (danger of degradation with formation of pellets, because of residual or accidental humidity).

b. Extraction without segregation. It is frequently desired to avoid this latter, because:

the "fines" generally have a different composition from the "coarse" particles, this making the measurements incorrect, the "fines" absorb more humidity, the "fines" flow less satisfactorily and are the last to flow, thus facilitating the formation of considerable dead stocks, which quickly become very compact and very hard.

The description which is to follow, taken in conjunction with the accompanying drawings given by way of example, will enable it to be better understood how the invention can be carried into effect. In the accompanying drawings.

Figure 18:
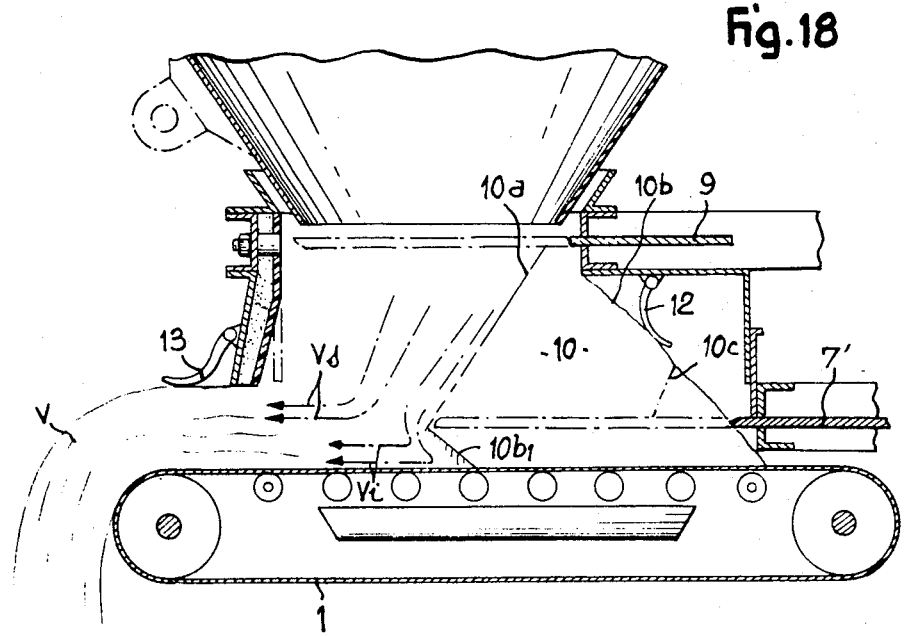
Figures 19, 20:
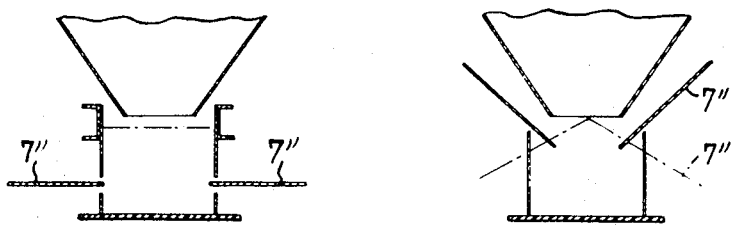
Figure 21:
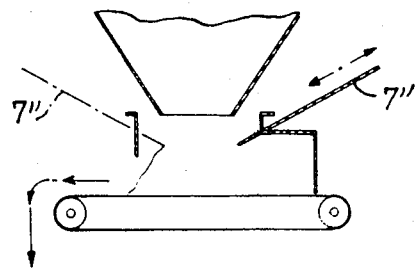
Figure 22:
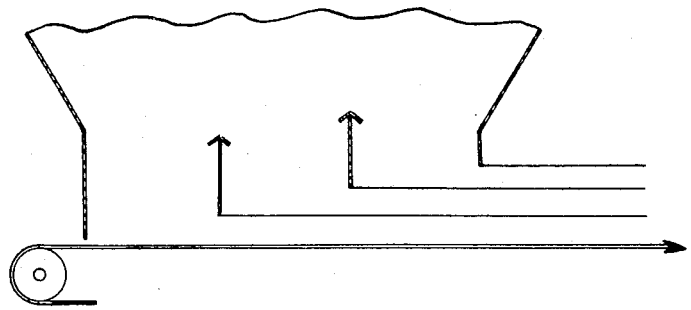
Figure 23:
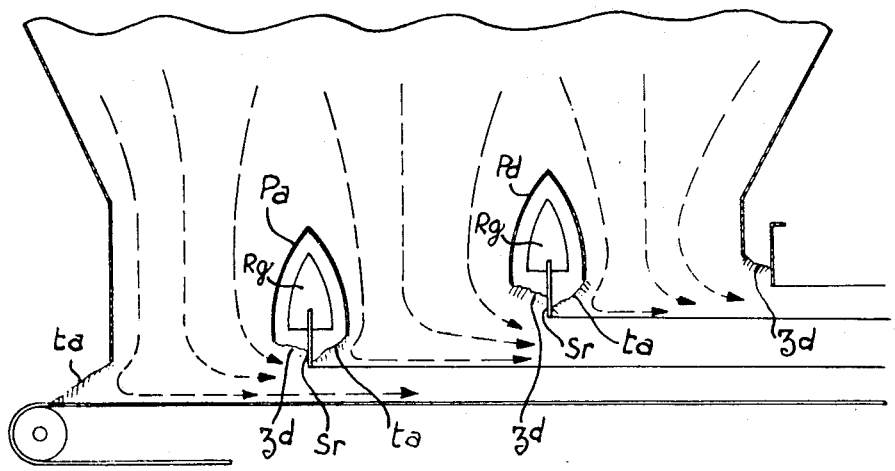
Figure 24:
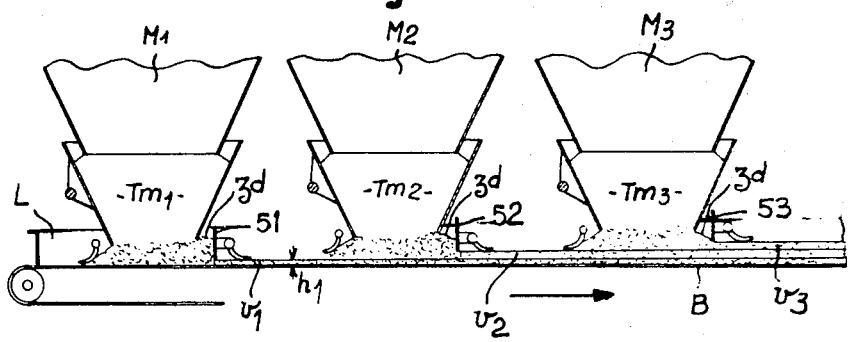
Figure 25:
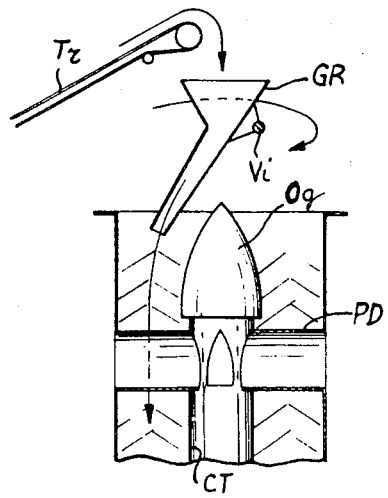
Figure 26:
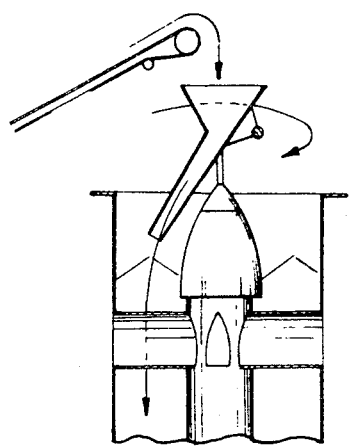
Figure 27:
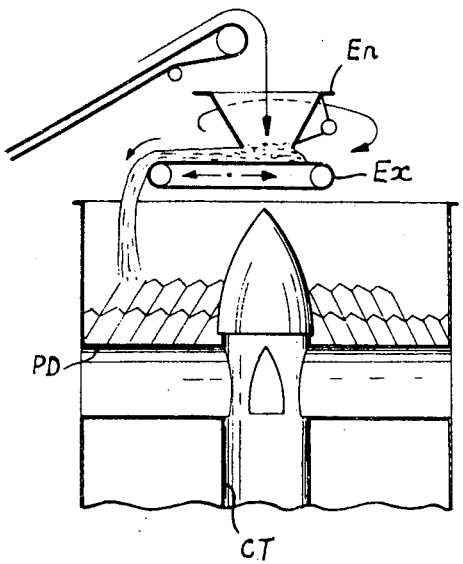
Figure 28:
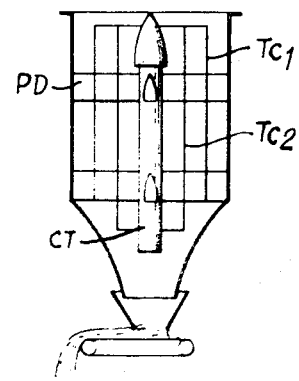
Figure 29:
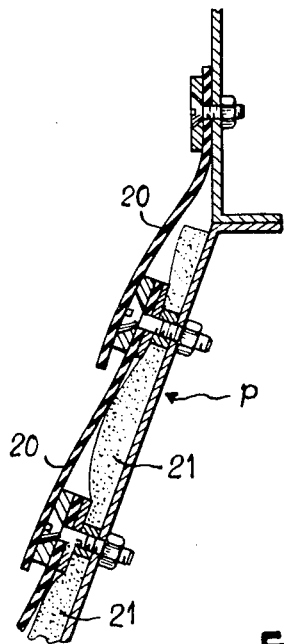
Figure 30:
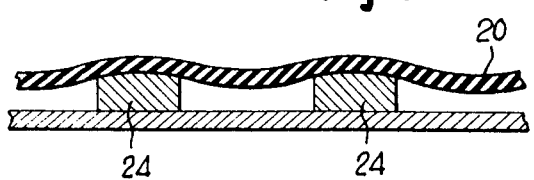
Figure 31:
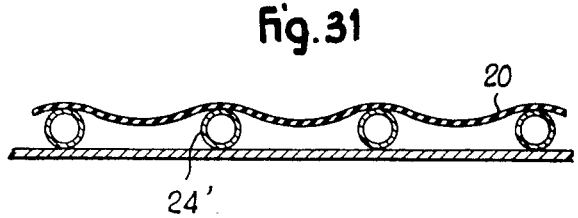
Figure 32:
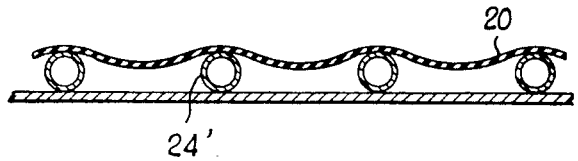

FIGS. 4, 5, 6, 7 and 8 represent different embodiments of a system of improved sealing joints, so as not to impede the mobility of the decompression hoppers TD or of the vibrated hoppers TV, FIGS. 9 and 10 illustrate two methods of bevelling the improved vibrated hoppers TV, so as not to impede the vibration of these latter, FIGS. 11 and 12 show one embodiment of a hopper which incorporates a decompression board, which possibly can be vibrated, preferably in intelligent manner, FIGS. 13 and 14 illustrate two embodiments of the recycling circuit in the case of the "cyclic declogging" when it is not possible to stop the supply means, FIG. 15 is a diagrammatic section of a bottom of a silo equipped with an intermediate transfer system having an adjustable opening, as proposed according to the invention for products having very variable flow properties, FIG. 16 is a diagrammatic view from the right of this assembly, FIG. 17 is a modified embodiment of this same assembly, FIG. 18 is another embodiment of this assembly, comprising one or two motor-driven registers, FIGS. 19 and 20 are views from the right of modifications which differ as regards the position of the two auto-adaptation half-registers, FIG. 21 is a diagrammatic longitudinal section of modifications as regards the position of the auto-adaptation register, FIG. 22 is a diagrammatic view of a conventional extraction assembly having a plurality of sills, in the case of a silo with a very elongated outlet, FIG. 23 represents diagrammatically a multi-sill extraction assembly in the case of a silo having a very elongated outlet and equipped according to the invention, FIG. 24 shows diagrammatically a multi-sill extraction assembly for a multi-outlet silo, FIG. 25 shows diagrammatically an arrangement at the upper end of a silo of small horizontal section, which is necessary to complete the extraction arrangement provided according to the invention in order to avoid the segregation, FIG. 26 shows diagrammatically one modified embodiment of the preceding assembly, FIG. 27 shows another modification of the preceding assembly, but provided for silos having large horizontal sections, FIG. 28 represents yet another modification for those cases where segregation is to be particularly avoided FIG. 29 shows diagrammatically a preferred method of lining an inclined wall of the transfer assembly, which is also applicable to all connecting channels between different manipulating units, FIGS. 30, 31 and 32 show modified forms of the preceding lining.

Figure 1:
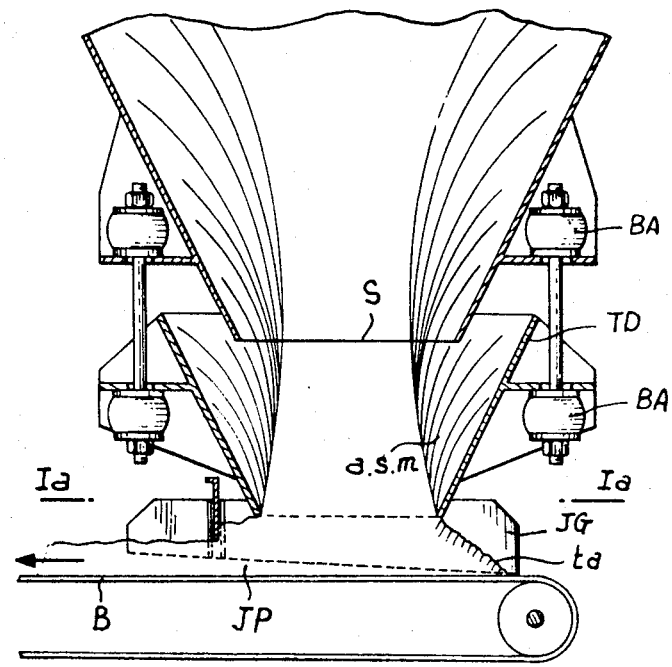
FIG. 1 is a diagrammatic view of a silo equipped with a decompression hopper according to the invention.
Figure 1A:
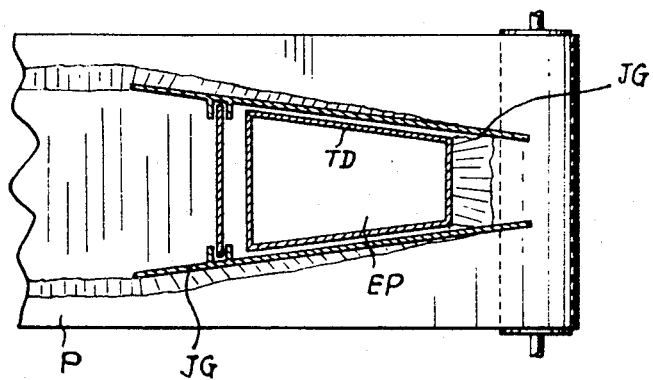
FIG. 1a is a section along the section line 1a—1a of FIG. 1.

FIG. 1 shows diagrammatically the base of a silo, with which is associated a transfer assembly comprising a decompression hopper TD disposed beneath the "outlet" of the silo. Such a transfer assembly comprising a single hopper is to be used when the "outlet" S, needed by the product in question, is not too large relatively to the dimensions of the effective extraction zone provided by the extractor.

According to one essential feature, the decompression hopper TD is suspended elastically and in a very flexible manner and also so as to be very mobile from the upper part of the silo, for example, by means of suspension rods having rubber shock-absorbing blocks BA; such a suspension permits the displacement of the hopper in both the vertical direction and in any horizontal direction. Instead of shock-absorbing blocks, it is however possible to use other arrangements, either along or in association, giving the suspension similar properties and increasing the mobility in the horizontal direction.

By way of example, it is possible to mention the arrangements which are known per se, such as devices comprising springs, chains, universal joints, Cardan joints, movable straps (such as those frequently used in weighing, particularly for weigh-bridges, and thus permitting a very high mobility to be obtained), etc.

In order to produce a decompression effect, and as shown in FIG. 1, the hopper TD comprises an upper opening section which is larger than the "outlet" s. Between the extracting band or belt B and the lower part of the decompression hopper, no structural or connecting element prevents the free flow of the products reaching the belt B or the free movement of the hopper (horizontally or vertically). This freedom of movement, which must only be impeded to the least possible degree by anything other than the produce itself, necessitates the provision on the conventional sealing joints of the improvements which are hereinafter described, in order to control the mobility of the assembly (with an automatic effect in destroying the clogging) and also in order not to reduce the strength of the vibratory force. This is true for all the decompression hoppers, which have always required a more or less complete sealing effect.

Figure 4:
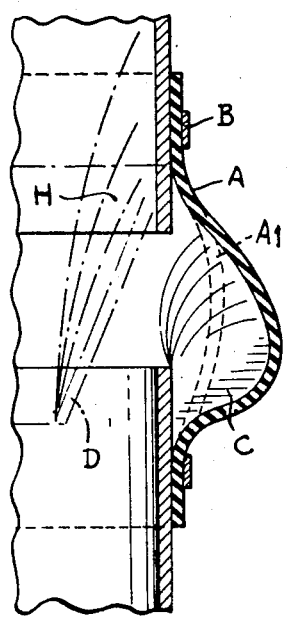

The conventional sealing system is shown in FIG. 4. The rubber joint A which is held in position by rings B, occupies the position in broken lines A1 when it is placed in position. The swelling of the joint is amplified by the vertical movement of the hopper, due to the flexion of the shock-absorbing blocks (or of the springs).

As soon as being set in operation, there is deposited in the zone C a quantity of material (raised product or dust deposits which cannot be prevented by the deflecting wall D sometimes provided) which, under the action of the vibration, is compacted, hardened and causes the joint to swell, this eventually resulting in the perforation thereof. For these reasons, it is necessary to provide relatively thick joints which are detrimental to the mobility. In order to overcome these disadvantages, it is proposed to provide the arrangements described in respect of FIGS. 5, 6, 7 and 8.

Figure 5:
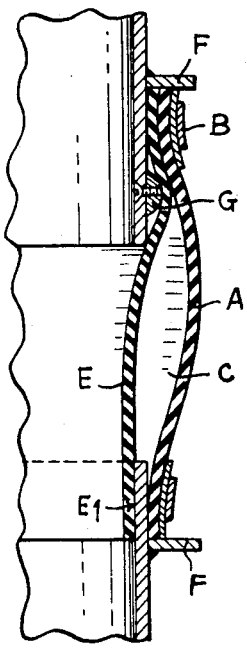

The arrangement shown in FIG. 5 provides a lower flap E, which is either depending or stuck at $E_1$, the said flap being made of a rubber having a low coefficient of friction, which will hereinafter be referred to. The zone C is thus protected and the suspended hopper maintains its mobility. In order to avoid the joint from slipping under the action of the vibrations, there are provided the hoop or band B, the two straps F and the circular projection G, which can be formed either by a semispherical element which is welded or screwed in position, or by any other means.

Figure 6:
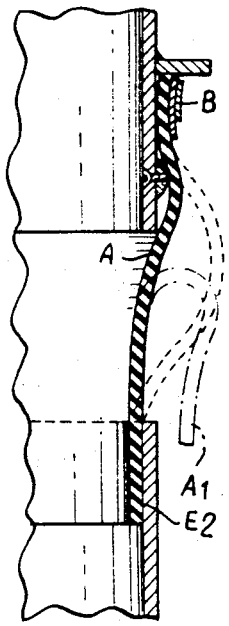

FIG. 6 provides a single rubber joint A, which is preferably of the "slipping" type, which is stuck at its lower end to the interior of the hopper at $E_2$ and which is fixed to the upper part by a band B. In order to facilitate the positioning operation, the joint can be folded along the path A1.

Figure 8:
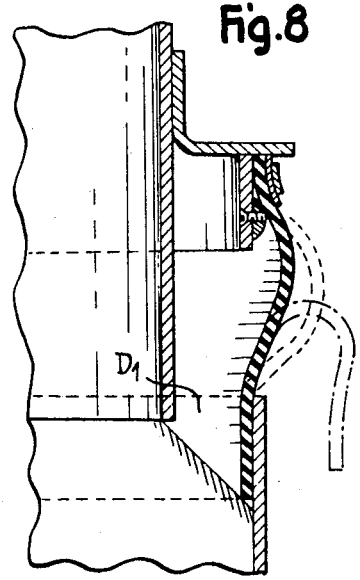
Figure 7:
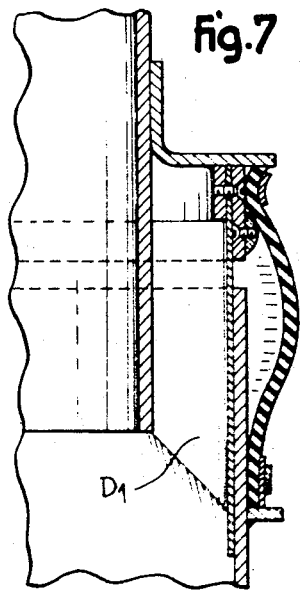

FIGS. 7 and 8 comprise the same arrangements, but with the formation of a decompression D1, which in addition to being useful for the flow, has the additional interest of protecting the joints from abrasion due to the flow of material, without being caused to provide a deflecting wall, such as D in FIG. 4, which has the disadvantage of reducing the flow outlet and of being the point of formation of a clogging, such as H (shown in FIG. 4).

In the case of hoppers having the form of a truncated pyramid, the different faces of the hopper are given values which are generally between 50° and 65°. The slopes preferably vary from one face to the other, in order to establish lack of symmetry in the distribution of the forces which, in conjunction with the high flexibility and mobility and with the progressive extraction, and the slope AR, produce an automatic effect in removing the deposits of dead stocks as they are being formed (a.s.m.; FIG. 1); preferably, and always in the case of a decompression hopper of truncated pyramid form, the smallest slope is provided on the preferred extraction side which is characteristic of the extractor under consideration.

Furthermore, according to the invention, there is provided between the decompression hopper TD and the belt B a space which is sufficient to permit the formation, at the time of extraction, of a "rear slope" ta ('rear' having to be understood relatively to the direction of extraction; see FIG. 1). Numerous tests have shown that the presence of a rear slope was advantageous, in that it facilitates the flow by increasing the actual length of the extraction zone of the belt, in that the loading of the belt is effected outside the zone under pressure situated perpendicularly of the lower opening of the hopper, and in that the product flowing from the silo is set in movement on the belt outside the said pressure zone and thus without appreciable slipping and therefore with an abrasion effect reduced to the minimum.

The hopper TD is advantageously provided with an extraction section EP of progressive width, that is to say, a hopper which increases in size in the direction in which extraction takes place. This progressive extraction, of which the form can be either trapezoidal or triangular, or more or less parabolic, or in accordance with any other progressive curve, etc., is known per se, but its use concurrently with the arrangements already mentioned assists the complete mobilization of the mass of stored products.

The centering chute JG for the product on the extractor element B will likewise be provided with a progressive clearance JP, which increases in the extraction direction (see FIG. 1).

In this way, there will be obtained a complementary effect as regards progression of extraction, a progression of the lateral sloping of the product and a decrease in the wear of the extractor element, and more especially of the rubber belts.

FIG. 1 represents an advantageous arrangement, which is hereinafter described. On account of the rearward slope ta, the centering member JG of the product on the extractor element is reduced to two guide checks JG, which can be slightly inclined or preferably vertical, or even with a slight reverse slope for the products with a very great tendency to clogging.

The rear slope permits the omission of the last inclined wall which necessarily exists at the rear on the conventional chutes, and which is always the point where clogging originates.

The guide checks JG can be fixed to the lower part of the hopper TD.

This arrangement and that previously described are particularly advantageous in the case where the hoppers TD are vibrated, as will hereinafter be explained, because there is no longer an inclined chute wall which is capable of promoting the initiation and the starting of a clogging, and the guide checks will, if necessary, be freed when the hopper TD, with which they are integral, is caused to vibrate. It should be emphasized here, for justifying the importance of the assembly of the proposed arrangements, that the clogging produced in silos and the formation of dead stocks always have their point of initiation on the lower edge of the inclined walls (and even sometimes of the vertical walls having a rough or rusty portion or only a slight projection or irregularity) bordering the lowest outlet opening.

Figure 2:
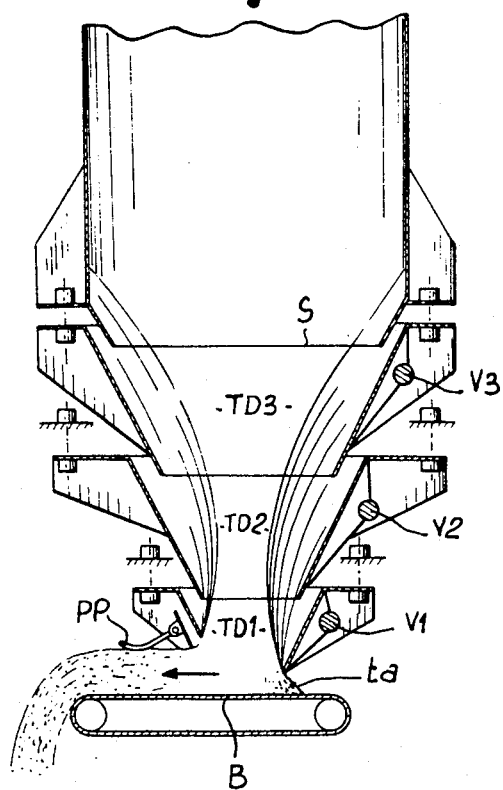
FIG. 2 shows a transfer assembly comprising a plurality of superimposed decompression hoppers.

In any case, it is essential, as soon as products of a somewhat clogging nature are dealt with, to provide the vibration of the last hopper or chute feeding the extractor element, because if only the penultimate one is vibrated, there is unavoidably established a start of clogging (or deposition of dead stock a.s.m.), which is progressively hardened and reaches the upper zones. FIGS. 1 and 2 give an idea of the method by which this clogging is progressively formed.

Finally, the decompression hoppers according to the invention are preferably provided with a lining, which is preferably slippery and elastically deformable for reducing the clogging and which will hereinafter be referred to.

In the case where the opening S or "outlet" has a too large dimension relatively to the extraction zone for only a single decompression hopper TD to be sufficient, a series of decompression hoppers $TD_1$, $TD_2$, $TD_3$ are used, as shown in FIG. 2, each hopper having a suspension system of the aforementioned type, the suspension system of an intermediate hopper preferably being connected to fixed points independent of the hopper immediately above: in this way, independently suspended hoppers are obtained, so as not to provide any danger of causing harmful settling and it is necessary to use suspensions which are very elastic and have a very strong damping action.

All the foregoing, concerned with decompression hoppers, is particularly recommended for products having a pouring capacity which is relatively bad but is also relatively constant.

The proposed solutions are found to be insufficient when the product has a very bad pourability, although fairly constant. In this case, the use of decompression hoppers is generally insufficient to avoid the clogging effects. According to the invention, use is then made of vibration. In the case of a single outlet, a decompression hopper of the aforesaid type is used, with which a vibration is associated.

According to the invention, the initiation of a vibration, its amplitude, frequency and duration, are carefully matched to the instantaneous state of flow of the products of the silo and its hopper.

The detection of the instantaneous state of flow can be effected in various ways, particularly by measuring a height or a slope of the product at a given level in the silo or the extractor, or by measuring the deformation of the suspension of one or several hoppers, or by measuring the load of the extractor in a certain zone, or by partial or total weighing of the extractor.

Figure 3:
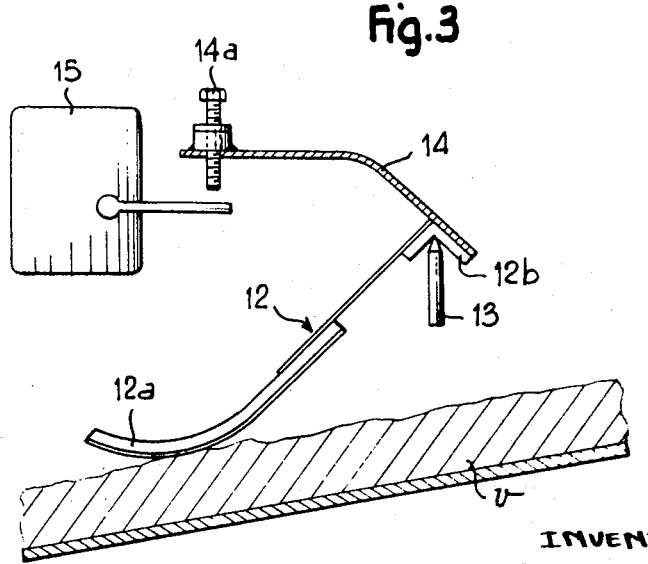
FIG. 3 represents diagrammatically a "feeler blade,"

For measuring the height of the stream at any point, it is advantageous to use a feeler blade of the type shown in FIG. 3. It must be understood that FIG. 3 is only given as an example of a very simple embodiment. The feeler blade 12 shown in this figure is adapted to control the height of a stream v. The blade 12 comprises a curved detecting element 12a which rests on the stream, the blade itself being suspended by a bracket 12b on a fixed knife edge 13.

By means means of the stop 14a of an arm 14, the pivoting of the blade 12 about the knife edge 13, caused by a sudden fall in the height of the stream v, causes the operation of a detector 15; this detector is for example a microcontact, a proximity contact, a mercury tube, a magnetic mercury switch, etc.

Depending on the type of microcontact being used, the stop 14a can be replaced, as is usual, by a cam-forming sector which has a progressive action and does not provide any danger of the contact being damaged.

With materials which have a very strong clogging action, the curve portion 12a is advantageously lined with one of the slippery materials which will be hereinafter discussed, otherwise the blade will be quickly soiled to an extent that frequent cleaning operations become necessary.

According to the invention, the feeler blades are used for controlling the height of the product downstream (height of extracted stream) and upstream (rear slope) of the extraction. In this sense, the feeler blade on the rear slope is more advantageous, because it gives an earlier warning, and avoids having a deficiency on the extractor element.

FIG. 2 shows a feeler blade PP for controlling the height of the stream or flow downstream of the extraction. This figure also shows vibrators V1, V2, V3, which are associated with the hoppers TD1, TD2, TD3. When several successive hoppers are associated in order to form a transfer assembly, it is essential, if the vibration is used, for this vibration to affect at least the lower hopper, which has to replace (or form) the centering chute (or supply chute) of the product on the extractor, as already explained above.

On the other hand, it is also essential for the declogging or freeing of the hoppers by vibration to commence at the lowest point, otherwise the released products of the upper hoppers will become jammed in the residual passage of that hopper which is situated below.

According to one feature of the invention, the feeler blades of the type referred to are used so that they initiate several successive vibrations of progressive efficiency as a function of the fall in the height of extracted stream: for example, a first vibration becomes operative for a decrease in the flow height of 10 to 15 percent, a second for a decrease in flow height of 20 to 30 percent and a third for a decrease greater than 50 percent. The duration of the vibrations is advantageously proportional to the decrease in the detected flow height, the first vibration lasting, for example 2 to 5 seconds, the second for 5 to 10 seconds and the third for 10 to 20 seconds. It is a question in total of a method of vibration having graduated progressive effects, which is a specific feature of the invention. Such a method of vibration is used for the products which relatively have little clogging action, for example, small coal.

For detecting the load of the suspended hoppers, it is also possible to measure the flexion of the shock-absorbing blocks by means of numerous devices which are know per se for measuring a displacement.

For measuring the load of the extracting belt in a given zone, it is possible, for example, in a manner known per se, to arrange a weighing platform beneath the belt. For the extractors which do not use belts, they can be weighed either completely or with a fixed point, in a manner known per se.

According to one feature of the present invention, variable and adjustable vibratory forces are preferably used. It is possible, for example, to employ electromagnetic vibrators which are capable of controlled variations in frequency and/or amplitude. It is also possible to use unbalanced vibrators having an adjustable speed and/or an eccentricity of the adjustable unbalancing means; a plurality of vibrators capable of acting separately or in combination can be used to give different vibratory procedures.

For assisting the flow in the silos and the hoppers, it is usual and advantageous to round them off or to bevel the angles thereof.

It is also desirable to do the same, inter alia, in respect of the vibrated decompression hoppers, but this is troublesome if it is obtained by rolling or by bending.

The welding in the angles of the bevelling plates is a satisfactory solution from the economic point of view and as regards flow. Nevertheless, it has the disadvantage of causing the hoppers to become too rigid, and these are then difficult to vibrate and to strip.

In order to overcome these disadvantages, provision is made in accordance with one feature of the invention, as shown in FIG. 9, for the bevelling plates to be welded on their upper portion only over a length corresponding to about a quarter or a fifth of their height. Thus, the part which is made rigid will only be the upper part, and this, because of being covered with the hopper immediately above it and the slope, is in practice not in contact with the material. All the free part, which is the longer part, will be able to vibrate at the same time as the vibrated hopper and at a suitable rate, which will facilitate the cleaning thereof and that of the hopper.

For avoiding the micro-folds due to the vibration always being effected along the line *aa* passing through the terminal points of the welds and causing a cracking, such as that which is usual for the metals subjected to alternate stresses at high frequency, this being all the more the case when the ends of the weld always show a crator zone with burning of the plate which weakens resistance at this position, a progressively extending indentation cavity is provided, which moves the fold line to *bb*, that is to say, into a zone where the metal plate is sound and will be able satisfactorily to resist the "-fatigue" of the metal.

The bevels will advantageously have a decreasing width (from top to bottom), each time that the slopes of the corresponding faces will be relatively small, as shown in FIG. 10.

FIGS. 11 and 12 illustrate diagrammatically as two perpendicular vertical sections one particularly interesting embodiment of a vibrated hopper TV which is suspended by a flexible suspension by means of shock-absorbing blocks BA. This hopper is equipped with a vibrator V capable of causing vertical or horizontal vibrations, as required by circumstances. In characteristic manner, the hopper is equipped with an assembly 30 forming a decompression platform and comprising one or two hollow prisms 31 forming transverse cross members, with which is associated a vibrating roof 32 of conical or pyramidal form, which is resiliently and/or movably mounted relatively to the prismatic element 31 by means of shock-absorbing blocks 33 or other devices as already described above. If there is only one hollow prism 31, as in FIGS. 11 and 12, the seating of the roof 32 is completed by supports provided on another cross member reduced to a simple plate 34. A vibrator 35 permits the roof 32 to be set in vibration independently, and the slope of said roof will be accentuated to a greater or lesser degree, depending on the pouring capacity of the product under consideration.

The prism 31 forming a cross member is preferably of the type described in the aforementioned U.S. Pat. No. 3,593,892, as a "decompression prism." It is thus fast with the vibrated hopper TV, while being accessible from outside through openings 31a. As a result, the vibrator 35 is accessible, so that it can be regulated according to the characteristics of the flowing product and its maintenance can be assured, even during the operation of the installation.

The single or double "cruciform" prism 31 and the plate 34, because they form cross members, are able to impede the sufficient vibration of the hopper TV in certain cases. If necessary, the prism or prisms will then be cut along the lines *xx*, and the vibrating roof 32 will rest by means of the blocks 33 on the truncated prisms which form brackets. The plate 36 for access to the vibrator 35 and ensuring the connection between the truncated prisms will then be "floating," that is to say, not rigidly connected to the said truncated prisms and if fluid-tightness has to be provided, rubber joints forming a "bellows" will be provided.

Another point of this arrangement is to make independent the vibrations of the hopper itself and of its vibrating roof 32, because the demands as regards vibrations of these two members can vary independently of one another and cannot always be satisfied by the effect of a single vibrator functioning continuously in a "blind" manner.

Experience has actually shown that, even for products which flow relatively well, a single and continuous vibration simultaneously actuating the hopper and the decompression roof, which is rigidly fixed to it, is capable of compressing the product above the vibrating roof into a growing deposit which is capable of completely blocking the flow. The zone situated beneath the roof can also be blocked if the delivery of the roof is greater at certain moments than that of the lower hopper. It is necessary to allow for general and local variations in the flowability.

As a modification, a vibrating roof such as 32, rather than being mounted above a decompression prism connected to the hopper, can be associated and usually suspended from an element of the tubular central chimney, of the type described in the aforementioned patent application, which then descends into the interior of the transfer system. The interest of this latter arrangement is that there is no obstacle capable of interfering with the flow in the confined zone of the circuit.

According to another feature of the invention, in order automatically to promote the complete flow of a silo in the case of products which clog very readily, a freeing cyclic vibration method is used, in which the last hopper before the extractor is vibrated under certain conditions as hereinafter indicated. The feeding of the silo is stopped periodically (the duration of the cycle being adjustable and regulated according to the agglomerating and massing power of the product at the time in question); the extraction continues until the moment when there is produced a fall in the height of the extracted stream or preferably a fall in the rear slope, which initiates a first vibration (of regulated maximum duration), which breaks up the accumulated masses, because at this moment they are still fresh and friable, and this is shown by a raising of the height of the stream or of the slope (or of the weight on the weighing platform), which stops the vibration; the same process is reproduced automatically for the other falls in height of the stream or slope, until the initiation of the vibration is no longer able to compensate for the lack of product. The silo is then completely empty, and it is at this moment that the "empty hopper" freeing and breaking vibration becomes operative, this being more efficient than the previous vibrations, just because the hopper is empty. Simultaneously, the supply to the silo is restarted, with the suitable delay, so that the arrival of the product at the level of the extractor takes place at a suitable moment, while being preceded by the freeing and emptying of the transfer assembly. In this way, a cyclic clearing or freeing is obtained, which causes a good internal cleaning of the silo.

Without these arrangements, there would be progressively produced inside the vibrated hopper and the lower hopper of the silo, and even in the shaft of the silo, clogging effects which lead to an immobilization of a large part of the useful capacity. These clogging effects are shown in FIG. 1. The vibration would only have occasion to become operative when the residual passage would be insufficient to ensure the necessary supply to the extractor. At this moment, the quantity of deposits will be such that a very large and certainly possibly prohibitive vibratory force will be required, and it will be necessary to have recourse to manual intervention, and this is inadmissible from an automatic point of view.

For making the restarting of the supply automatic, the "empty vibrated hopper" declogging vibration can be synchronized, for example:

either by the fact that this empty hopper vibration absorbs an intensity greater than the preceding vibrations, because of the increase in amplitudes (use of an adjustable intensity relay), or by the fact that this last vibration lasts throughout the cycle without the rear feeler blade reassuming its normal position.

The resupply at the satisfactory moment, in order to avoid a "lack of material" on the extractor, can raise problems in installations operating "continuously" and in respect of which there has never been any interest in creating supplementary discontinuities.

In particular, there is no point in completely stopping the supply means of the hoppers, because of the repercussions which this causes in the automatic operation of the installation, in view of the fact that, statistically, the major part of the troubles is produced at the time of restarting. It is more advantageous to pass automatically to a minimum supply rate of flow.

On the other hand, for the silos of which the supply operates by the "all or nothing" principle, by means of maximum and minimum level contacts there are normally only problems when the supply means cannot be restarted under load and the response time for the arrival of the product is too long in order to ensure the withdrawal by extraction.

In order to avoid these disadvantages, in accordance with one feature of the invention, the cyclic declogging or freeing is completed by the addition of a buffer hopper T$t$ which stores the supplied quantity during the freeing period and then restores it. There is thus provided a substantially instantaneous possibility of resupply, in order to avoid a deficiency.

FIGS. 13 and 14 illustrate as non-limiting examples the use of this process in the case of:

a single outlet silo, supplied by an adjustable delivery belt, which it is not desired to stop, and in this case, the installation can be constructed according to FIG. 13, and comprises:

a finer mechanism automatically causing the variation of the supply to a rate lower than that of the extraction, this occurring N times every 24 hours (it being possible for N to be adjustable from 12 times per 24 hours to once for every two or seven days, depending on the pourability and the clogging nature of the product, the season, etc.), the bypass B$p$ which, because of an automatic control initiated by a low level (or weighing system, etc) of the main silo, permits the delivery of the silo to pass into the hopper T$t$, the hopper T$t$, the capacity of which is calculated so that it is able to store the quantity of material delivered by the supply means during the complete cyclic freeing operation, that is to say, during the time necessary for emptying the vibrated hopper TV and for effecting the breaking-up operation, this latter operation being moreover only a few seconds (2 to 5 seconds), because at this moment the efficiency of the vibration is at its maximum level, since the hopper TV is empty and the deposits are sufficiently fresh.

the recycling extractor E1, which returns the stored material to the silo through the inlet F, the feeler blade pp, which controls the rear slope $ta$ of the extractor E of the silo and which controls the resetting of the "silo supply" position of the bypass B$p$, and also the starting of the extractor E1, as soon as the freeing operation is completed.

This assembly can operate in the following manner:

As soon as the timer mechanism has automatically caused the decrease in supply for giving it a value lower than the withdrawal flow, the silo, or at least the still active part thereof, starts to be emptied. It is to be noted that the inactive part, that is to say, the dead stock, will be greater as the freeing operations are closer together and the accumulations will be easily destroyed if they are recent and still friable. If one waits too long, the accumulations will assume the curve shown at Co in FIG. 13 and there will be the danger of the vibration becoming inefficient, because of the duration and extent thereof.

When the low level indicator is reached (level with radius $\gamma$, weighing platform on the conveyor E, etc.), the bypass channels the delivered quantity on to the buffer hopper T$t$ and possibly gives the order to reassume the normal delivery if the response time demands this.

When the hopper TV is empty, the feeler blade pp detects the disappearance of the rear slope and starts up the vibration.

The cleaning and then the clearing is effected as already explained.

Each time a vibration is initiated, the cleared product reforms the rear slope and the blade pp stops the vibration, because the defect has disappeared.

When the hopper is empty and the last vibration does not restore the product, the timing mechanism which is to limit the duration of the vibration (and which this time has gone up to the end of its cycle), stops the latter and simultaneously causes the resetting of the bypass Bp in the "feed silo" position and the emptying of the hopper Tt through the opening F by restarting the extractor E1.

Because of the slow speed generally adopted for the extractor E and because this type of extractor is first of all emptied through the rear, the arrival of the material has sufficient time to complete the stream and to avoid a lack of material.

The hopper Tt is also provided with a vibrator V2 which is set in operation by a feeler blade PP (so that the emptying of the hopper It is in fact complete).

The arrangement provided for the hopper Tt and the opening F avoids the use of a recycling elevator.

As shown in FIG. 14, it is possible to omit the extractor E1 and to replace it by a pivoted gate Pb or a motor-driven gate which closes automatically as soon as the hopper Tt is thought to be empty and clean (control by the end of the vibration which itself is controlled by a timer or by any other conventional control means).

The foregoing assembly of arrangements is suitable for products having an average pouring capacity (decompression hopper) or very bad pouring capacity (vibrated hopper), this pourability being however relatively uniform. The arrangements proposed are insufficient for products with a widely variable pouring capacity, particularly those which result from an extraction from pits or mines and subject to large variations in humidity rates.

Under these latter conditions, the use of declogging or freeing vibrations, when the product leaving the "outlet" of the silo does not have a sufficient pouring capacity in the transfer assembly loading it to the extractor, is only a half-measure, since the clogging has a tendency to be produced from the interruption of the vibratory procedure, unless there is a sufficient and rather unforeseeable improvement in its pourability.

Under these conditions, in accordance with one essential feature of the invention, the compacting in the transfer assembly is anticipated by permanently adjusting the flow opening of the transfer assembly to the instantaneous pourability.

These arrangements are illustrated by FIGS. 15, 16, 17 and 18.

FIG. 15 shows the bottom or base of a silo S, of which Ss is the natural automatic flow "outlet" as defined above. The assembly according to the invention is interposed between Ss and an extractor E. This extractor, which can be a measuring arrangement, comprises for example an endless conveyor belt 1 guided over rollers 2. Below the "outlet," the assembly according to the invention comprises a hopper 3 suspended at the bottom of the silo, for example, by sufficiently flexible shock-absorbing blocks 4, for permitting the vibration of the hopper under the effect of a vibrator 5, without any danger of the remainder of the installation being caused to vibrate (and thus without any danger of causing a heaping and compacting of the product in the upper part of the silo S). Situated beneath the hopper 3 is the control section 6, which comprises in characteristic manner a movable wall 7 which is capable of turning about a horizontal shaft 7a. Arranged perpendicularly of the shaft 7a are two lateral walls 7b which are generally fixed. Position facing the adjustable valve arrangement 7 is another fixed wall 7c.

The pivoting of the valve arrangement 7 about the shaft 7a is controlled by a positioning jack 8. The jack 8 is characteristically controlled by the land operative in the region of the belt 1 which is situated beneath the control section 6. For this purpose, the belt rests in this zone on a weighing platform T equipped with weighing rollers 2a. The load on the weighing platform can control the movement of a beam acting on the jack 8, for example, by an "all or nothing" system, as shown diagrammatically in the figure. Under these conditions, the section offered by the control section 6 automatically regulated as a function of the load on the weighing platform, that is to say, of the instantaneous pourability of the product. The flow or passage section is thus constantly adapted, the dangers of clogging are eliminated and it is pointless in most cases to cause intervention of the vibration of the hopper 3. However, if the valve arrangement 7 is open to its maximum extent, the system always detects an insufficiency in the load on the weighing platform, and it can initiate the vibration of the hopper 3. The opening of the register, which is always relatively slow (because of the necessary torque) is able to react too slowly, in the event of a sudden large decrease in the pouring capacity, due for example to the passage of a very wet batch of material. In this case, the flow section which can be used at this instant (or even for several instants) will be too small to ensure the delivery. The result thereof is a decrease in the height of the stream v and the setting up of the vibration by the feeler blade or preferably by the weighing platform TP. All this represents a safeguard against the sudden variations in the sense of aggravating the poor pourability.

It is obvious that the automatic adaptation will also react in respect of weight variations being caused by variations in static and dynamic pressures, this moreover operating in the same direction, and this is advantageous for the regulation of the pressure on the extraction zone and thus for standardizing the value of the extracted apparent density.

In this way, there is provided a very interesting arrangement for measurement by weight (or desimeter), in the sense that the weighing arrangement being used is bifunctional:

automatic adaptation, assisting the flow and the extraction, automatic regulation of the apparent density of the extracted volume, this being effected before the passage of the register calibrating the height of the stream, and no longer, as with the conventional dosimeters, after the passage of this register. In actual fact, for these conventional apparatus, a deviation is found and an attempt is made subsequently to correct this.

The foregoing description thus provides for two types of regulation by weight of the volumetric extraction, from the point of view of precision:

the dosimeter for "usual precision", which only comprises the "bifunctional" weighing arrangement as described above;

the dosimeter for "fine precision", comprising two weighing arrangements operating "in series":

the first arrangement, referred to as "bifunctional" and situated beneath the "outlet" of the silo is used for the automatic adaptation, which forms an excellent preliminary operation as regards regularization of the extracted apparent density; the second arrangement, disposed after the register for regulating the height of the stream, as with the conventional dosimeters, and completing the regulating action of the automatic adaptation for obtaining a finer accuracy as regards the measurement by weight.

The automatic adaptation system is not only of interest as regards improving the poor flow properties and the adjustment of the extracted apparent density, but it also avoids the overloading (or the always troublesome over-dimensioning) of the extractor under the maximum pressure being exerted by the products when they are dry and flowing well.

It is obvious that, instead of the hopper 3, it is possible to use an assembly of superimposed hoppers, as in FIG. 2.

The lateral faces 7b of the control section, and also the face 7c facing the valve arrangement 7, can with the advantage be lined with a lining which avoids the sticking of the materials, that is to say, a material which at the same time is slippery and is capable of slight deformations, as will hereinafter be explained.

The walls 7b, 7c can with advantage also be capable of being vibrated or moved slightly, so that it is possible where necessary to bring them into a position with a slight opposite slope. This arrangement can be of very great interest for extreme cases of bad pouring capacities (for example, for very clayey and humid marls). It would be impossible to apply this without the "automatic adaptation", because when the products are dry, they would exert a prohibitive pressure capable of causing the extractor to jam or to cause rapid wear on said extractor.

It is expedient to point out that the valve arrangement 7 can occupy a position such as the position shown in full lines in FIG. 15, in which it is directed obliquely towards the rear of the extractor, thus forming an opposite slope. With the valve arrangement in this position, the flow opening offered to the materials below the level of the shaft 7a increases from top to bottom (widening effect). Such an arrangement with a wall having an opposite slope is very favorable for the extraction of clogging products, because it increases the "effective" length of extraction. This arrangement also has anti-wear effects for the belt, in conjunction with the rear slope ta.

FIG. 17 is substantially identical with FIG. 15 and the same references have been adopted here for indicating the unchanged elements. As well as the valve member 7, the control section 6 is here provided with a motor-driven register 9, which is displaceable horizontally along a slideway 9a in order to control the passage of materials immediately beneath the hopper 3. The register 9 is particularly useful when the closing of the valve member 7 is made difficult by the pressure of the stream of flowing materials. In this case, the register 9 is moved in the closing direction (this being possible, since it has a fairly sharp edge 9b for penetrating into the stream). Once the register is closed, the section 6 can be completely or partially emptied beneath it, this enabling the valve member 7 to be brought to the required closing position without any prohibitive forces. By "desired position," it is necessary to understand the position corresponding to the indications given by the weighing detector system. Conventional procedures can be used for memorizing the value of the closing of the valve member indicated by the weighing system.

As a modification, provision can be made for only closing the register 9 when the positioning jack 8 requires this, because it meets a resistance to the too great closure. The increase in resistance can be determined by conventional means, such as a current relay which releases when the current absorbed by the jack exceeds a certain threshold; increase in the pressure for the hydraulic or pneumatic positioning jacks, flattening of an elastic system (springs and/or rubber shock-absorbing blocks, etc), giving an electric contact when the flexion exceeds a certain adjustable value, etc.

The concurrent use of a control section with an adjustable opening adapted to the pourability of the product, a safety register and vibrators, which only become operative above the control section when the automatic adaptation of the opening to the pourability reaches its limits enables a true automatic condition of the flow to be obtained.

FIG. 18 represents a modification of the invention, which is similar to that shown in FIG. 3, except that the valve member 8 is here replaced by a sliding register 7', which is connected as above to a positioning jack (not shown).

Such an arrangement has a certain number of specific advantages: the register 7' authorizes the formation, when it is wide open, of a rear slope 10b, the advantages of which have already been seen.

When 7' is almost closed, it restricts the passage of the extracted stream or flow (at the same time as it reduces the pressure on the belt).

The rear slope 10b1, provided beneath the register 7', maintains for this assembly the advantages of this method of loading the belt, of which the great interest is that the bringing of the grains up to speed in contact with the belt is effected free from the pressure of the silo, since it is achieved at the end of the free slope, both in the case of 10b (large opening) and the case of 10b1 (half-closed). The grains furthest upstream pass beneath the slope (i.e. 10b or 10b1), of which the upstream portion is under low pressure, being thus brought up to speed without slipping (and therefore without any wear).

Finally, the layer in contact with the belt is compacted under the pressure zone and it then behaves like a new extracting belt, of which the level is raised by the thickness of the layer, thus ensuring that the belt is protected against abrasion.

It can be considered that, in the formation of the stream of products V carried along by the extractor belt 1, there is superimposition of a series of lower streams Vi originating from the collapsing of the slope 10, which is constantly destroyed and reformed, and upper streams Vs originating from the main flow of the silo. The streams Vi reach the belt 1 with a low kinetic energy and a low pressure, whereas the streams Vs reach the streams Vi with a much greater kinetic energy. Because of this fact, the existence of the slope 10 appreciably reduces the wear on the extractor belt.

The upper faces of the motor-driven registers, such as 7' and 9, are advantageously lined with very slippery material, such as those which will hereinafter be referred to.

With the system according to FIG. 18, the vibration of the hopper 3 can also complete the action of the registers. It can be initiated either by the weighing system, which then becomes bifunctional, or by a system for controlling the rear slope or level of the stream V, such as the feeler blades 12 and 13.

It is preferably initiated when the register 7' is towards the end of its opening travel and the load of the extractor is still insufficient or tends further to decrease.

With the opening of the register, the natural flow slope passes from 10a to 10c. At 10c, the "upstream" feeler blade 12 detects a deficiency of material. This detection is effected before the detection by the "downstream" blade 13, of a fall in the height of the stream or flow. This "advance with detection" is advantageous, because it permits a more rapid and consequently more efficient automatic intervention, especially when there is taken into account the relatively large respite which is always available, because of the relatively slow speeds adopted for the extractors of products which do not flow well and which are generally over-dimensioned from the sectional point of view (therefore slow speed). The earliness of the detection by the rear feeler blade 12 allows a longer and sufficient time for operating the relining of the stream before any deficiency appears on the extractor element.

Other register arrangements which also form part of the invention can be adopted:

FIG. 19 represents very diagrammatically as a view from the right the transfer assembly equipped with two lateral and horizontal half-registers 7''.

FIG. 20 shows very diagrammatically in respect of the same assembly the possible arrangement of two inclined half-registers, which are descendant (7'' in full lines) or ascendant (7'' in broken lines).

FIG. 21 shows very diagrammatically a longitudinal section of the same assembly, equipped with a single rear register which is inclined (7'' in full lines) and, as a modification, the arrangement of a single front register which is inclined (7'' in broken lines).

The inclined arrangements which are descendant and which can be imposed on the question of size are also of interest for a decrease in the cutting force and for the automatic cleaning of the upper surface of the register.

On the other hand, the two registers 7' and 9 (FIG. 18) can be displaced simultaneously, while exerting a complementary action for controlling the passage of the products in the control section.

According to another feature of the invention, in the case of silos having several outlets or a very elongated outlet in the extraction direction, an extraction procedure having multiple sills is used, which can be combined with the foregoing arrangements.

The use of several sills has already been obtained in accordance with FIG. 22, in the case of a single elongated outlet, but it has the disadvantage of not permitting the access to, the regulation and the maintenance of the sills during the flow procedure.

FIG. 23 represents a solution which overcomes this disadvantage and further mobilizes the mass of the silo, because of the decompression zones zd and the extractions by a rearward slope ta. The openings Rg serving for access to the adjustable sills Sr are formed inside the decompression prisms Pd.

This entire assembly considerably improves the extraction and the complete mobilization of the mass of the stored product.

If the prisms show the danger of becoming clogged for certain products, they will be "flexibly" mounted and provision will be made for them to be intelligently vibrated.

FIG. 24 illustrates these arrangements in the case of a multi-outlet silo.

In the embodiment which is illustrated, the silo comprises, for example, three containers $M_1$, $M_2$, $M_3$, each equipped with a suspended decompression hopper TD or a vibrated hopper TV, of the types which have just been described.

According to one feature of the invention, the hoppers $Tm1$, $Tm2$, $Tm3$ discharge the products into a channel defined by the extractor belt B and two lateral walls L, the assembly thus determining a trough section. On the belt B, the height of the streams leaving the different hoppers is determined by the sills 51,52,53, which are adjustable in height, which can be formed by vertically movable registers and which preferably are so arranged that they form decompression zones zd. The containers $M_1$, $M_2$, $M_3$ succeed one another in this order in the extracting direction and the sills 51, 52, 43 are regulated for successively increasing stream heights. With this arrangement, the belt is first of all charged with the stream $v_1$ leaving $M_1$, the charging or loading of the belt being effected by rearward slope: the product, having banked up, covers the belt well within the pressure zone of the first container, thus forming a first layer of product, which serves as extractor and protector of the belt against abrasion. The streams of flow v then passes beneath the following container $M_2$, and its upper part behaves like an extractor belt, the level of which should have been raised from the height $b_1$ of the stream $v_1$. Obviously, the height of the transfer arrangement associated with the container $M_2$ is determined so as to permit the free flow, with rear slope or banking, of the products leaving $M_2$ and reaching the imaginary belt formed by the upper part of the stream $v_1$. The same occurs in respect of the products reaching the level of $M_3$.

It is important to point out that the multi-sill arrangement briefly described above only functions satisfactorily in practice when using hoppers permitting a rear slope or banking. Experience shows that, without this arrangement, accumulations are formed unavoidably upstream of $M_2$ and $M_3$, which lead to overflowing if the trough is not covered or to dangerous and clogging compressions if the trough is covered.

It must be emphasized that the multi-sill extractions described above are applicable for all the types of extractors already previously referred to (line 16, page 5).

In an installation of the type shown in FIg. 24, the control of the charging of the extractor can be effected, for each sill, by feeler blades and particularly those which control the stream height or preferably the rear slope, or both at the same time by way of a precautionary measure.

The present invention also proposes a particular method of operating silos, when the products are very clogging and in addition are very liable to form a mass, particularly because of their hygroscopic state.

According to the invention, a withdrawal method which is known per se but not used at the present time for this purpose is proposed, this being called "excess withdrawal with overflow:" in order to avoid immobilizing effects inside the silo, the products which it contains are extracted at a very much higher rate than the necessary effective rate, by effecting the mass flow by all the means previously indicated (namely, those of the aforementioned U.S. Pat. No. 3,593,892); the difference between the mass flow rate and the useful rate is recycled to the upper part of the silo, using all appropriate conventional means. There is avoided in this way the immobilizing effects which are particularly harmful in the case of products which mass together and which could not be avoided by a single extraction with overflow, in the absence of the mass flow.

It is of interest to mention that all the aforementioned arrangements are applicable to the case of the extraction of fine and very fine powders, which are generally extracted in the fluidized state. According to the invention, a mass flow is proposed for those products, by means of the assembly of the arrangements provided in the present application, and also prism the aforementioned U.S. Pat. No. 3,593,892. The Applicant has found that, contrary to the widely held prejudices, the fine powders have rates of flow which are similar to clogging products in powder form, and that it is possible to avoid the phenomena known as "running" (spontaneous and dangerous flows, like a liquid under pressure), by causing a general mass flow so as to avoid any stagnation, and also that the last product which has arrived is the first extracted.

Actually, if the withdrawal is not of the "in mass" type and in the absence of fluidification of the base of the silo, a chimney is formed in the interior of the powder (with a silo having a single outlet). The aerated product which has just been introduced into the silo circulates inside the said chimney. Outside the chimney, the powder stagnates, in deaerated, loses its characteristics of hydrodynamic flow, in order to adopt those of arching and clogging products.

The rims of the chimney now and again collapse as an avalanche, with the result that considerable tons of material are set in movement (tens of tons and, with the large silo, hundreds of tons).

In the lower part of the chimney, there is then established a considerable and very fluidifying instantaneous excess pressure, by which all the lower zone of the silo can be virtually brought into a form "like water" under pressure.

The arrangements defined above and permitting the stagnation and formation of chimneys to be avoided and which regularize the extraction solve this problem.

Moreover, the assembly of the arrangements as defined above enables extraction to be carried out with segregation, because of obtaining a flow "in mass," and this, by avoiding the formation of a chimney, obviates one of the two main causes of the segregation in the silos and which concerns the grading at the time of withdrawal.

If it is desired to obtain a more complete result, it is necessary to remedy the second cause, which is the grading being produced on the slope which is formed at the time of filling.

It is then necessary to adopt a filling system distributing the material over the entire horizontal section of the silo and reducing to the maximum extent the possibility of banking or sloping.

FIGS. 25, 26 and 27 represent as non-limiting examples some methods of distribution which are more perfect but also more complex.

FIG. 25, which corresponds to the case of the silos having a small horizontal section, represents a silo which is fed by a rotatable chute GR driven by means as known per se. This arrangement can be completed by the tubular chimney CT, held by the decompression prisms PD and cupped by the ogival member OG provided by the patent application already referred to.

The chute GR can be freed from clogging by a vibratory system Vi which can either operate continuously or according to a cycle following a program, or after each stoppage of the supply by the conveyor Tr, or by its increase in weight, etc.

In order not to set up a series of residual vibrations, which would provide the danger of the material being unsuitably compressed in the silo, the chute GR will be mounted with shock-absorbing blocks.

FIG. 26 represents an arrangement similar to the foregoing and formed by a rotatable funnel with an eccentric outlet which rests on the upper ogival member Og of the tubular chimney.

The foregoing arrangements are only appropriate for silos having a small or medium horizontal section. As regards the large silos, the heap which is supplied would again become too segregating, because of its size.

Under these conditions, it is necessary to provide the addition of a second movement permitting the jet of product to cover the entire section of the silo.

As a non-limiting example, this can be: the chute GR of FIG. 25, which is given a pivot in its upper part and a control means permitting its inclination to be varied in an "adequate manner" during its rotation.

the arrangement shown in FIG. 27, which comprises:

a fixed (or rotated) funnel En which can be vibrated, preferably intelligently, or at least on which has "controllable clogging" and "automatic declogging or freeing" because of the means already referred to, an extractor Ex having two possibilities of movement: it is rotated about the vertical axis of the silo, driven by conventional means, and being suspended from the funnel En or resting on an independent platform, it is given a translatory movement so that the jet of product can be displaced "adequately" over the length of one radius of the silo and in two directions. As a result, the said jet describes a spiral which is sometimes increasing and sometimes decreasing.

The charging of the silo is effected by superimposed layers and by successive passes with a spiral curve, as indicated diagrammatically in FIG. 27, the height of the layers and the thickness of the passes being adjustable according to the speed of rotation and the speed of displacement which are chosen.

In the foregoing examples, we understand by "adequate" mobility that which maintains for the jet of product a constant linear speed in the horizontal plane, that is to say, the translatory speed of the extractor Ex or its speed of rotation, or the two together, must be controlled for this purpose by the conventional means, in order to obtain a constant speed along the spiral, thereby avoiding a very unequally distributed loading with a considerable heaping or banking. This arrangement is essential, at least every time that the radial travel of the jet is sufficiently large to create an appreciable filling inequality. The combination of the movements can affect all forms other than spirals, without departing from the scope of the present invention.

By way of example and without having any limiting effect, it is possible to provide an alternating "reciprocatory" movement along one radius before carrying out a new rotational movement (which rotation can be produced intermittently or continuously), etc.

This arrangement can advantageously be completed by the systems comprising central chimneys, prisms and ogival members as already referred to.

In those cases where the segregation is to be even more avoided, this entire assembly is completed by one or more complementary concentric tubes, such as Tc1, Tc2, which are shown in FIG. 28, this corresponding to an anti-segregation silo of large capacity, in respect of which it is desired to reduce the segregation to the minimum.

The tubes Tc1, Tc2, and also the tubular chimney CT, are held in position by the prisms PD already referred to or by simple vertical and radial plates, if the need for a prims does not arise (for example, in the case of silos having a small height, etc).

For sticky and clogging products, these tubes could be partially or completely lined with slippery paints or slippery materials which will hereinafter be referred to.

Since a complete lining would be difficult, partial linings will be provided, for example, in a check pattern, so that the zones of sliding material exert a strong pressure on the other zones and break them up, or in the form of vertical strips which assist the breaking up of the flowing masses and the subsidence thereof.

For example, it is possible for only one out of two of the radial channels to be lined and these will be the first to be emptied; the others will break up more easily, because they no longer rest on the material which breaks their movement, their impulse and their flow.

FIG. 29 illustrates one particularly interesting method of lining a fixed or movable inclined wall $p$, which forms part of the transfer assembly. For such a lining to be efficient, it must be at the same time be very slippery, deformable and elastic.

According to one feature of the invention, such a lining is formed of strips 20 of a very slippery substance, such as slippery rubber, oxolit, hostalen gur, PTFE or gaflon, in a small thickness (1 to 2 mm), etc., a deformable sub-layer 21 (for example, consisting of foam rubber or a bed of springs or rubber tubes capable of acting as a spring) being disposed between the wall and the strips 20.

In a characteristic manner, as shown in FIG. 29, the strips 20, which are suspended at their upper ends, have a reduced vertical height, (in order to avoid wrenching effects and a considerable elongation, producing a tension and a rigidity which makes the material subject to abrasion), and overlap one another in the manner of the tiles of a roof, the free end of one strip covering and protecting the points at which the adjacent lower strip is fixed. Without this latter arrangement, the fixing means form reliefs, on which the first deposits become clogged, these then building up with stratified layers and developing progressively at a more or less high speed, depending on the clogging characteristics of the product under consideration.

The fixing bolts 22 preferably have countersunk heads (milled head, hexagonal head, etc.), so as not to cause the strips 20 to form protuberances or local wear or initiation of a deposit, (because of the local stiffening of the strips 20 caused by the bolt heads) and provided with crossmembers 23 designed to limit the crushing of the pliable sublayer 21, otherwise it would become too hard and too rigid and would lose its efficiency.

Many other devices can be used in addition to springs or thick pliable rubber or thick rubber foam, as already referred to, for establishing the necessary elasticity of the sub-layer.

For example, and without this representing anything of limiting nature, it is possible to visualize;

the sub-layer being formed of flat and narrow strips 24 consisting of thick or flexible rubber which are stuck or fixed by any other means at their upper end and hanging vertically on the slopes of the hoppers, in order to provide in horizontal section the arrangement shown in FIG. 30. In this case, the flexibility will provide the possibility of the horizontal strips 20 flexing between the vertical strips 24;

the strips 24 being replaced by the tubes 24' (see FIG. 31), which are only fixed at their upper end;

for the sub-layer to be formed (see FIG. 32) by one or more horizontal strips 21' fixed by iron rods 25 and bolts 26 in such a way that they are corrugated between each fixing point. The result of this arrangement is a flexibility of the layer 20, which can be regulated by the size of the corrugations.

The above examples assume that the only direction of flow of the product is a direction parallel to the corrugations, otherwise there would be abrasion of these latter.

It is obvious that the invention is not limited to the embodiments which have been described, but covers all modifications coming within the scope thereof.

What is claimed is:

1. A silo for materials in granulated or powdered form, comprising a fixed silo body provided in its lower part with converging walls terminating in an outlet opening, a hopper disposed beneath said outlet opening, a conveyor disposed beneath said hopper, said hopper being so arranged with respect to said conveyor that material leaving the hopper normally forms a constantly renewed rearwardly directed slope on said conveyor with respect to the direction of movement of the material thereby, the slope being representative of the material flow condition through said outlet opening, declogging means, and sensing means responsive to said slope for controlling said declogging means to prevent an eventual clogging of the material within said silo body.

2. A silo according to claim 1, wherein said sensing means include a pivotally supported feeler blade adapted to engage said slope so that the angular position of said blade depends on the material flow condition through said outlet opening.

3. A silo according to claim 1, wherein said declogging means include means resiliently mounting said hopper with respect to said silo body, and means for vibrating said hopper when actuated by said sensing means.

4. A silo according to claim 1, wherein said declogging means include at least one intermediate hopper resiliently mounted with respect to said silo body between the outlet opening thereof and the first mentioned hopper and means for vibrating said intermediate hopper independently of said first hopper when actuated by said sensing means.

5. A silo according to claim 1, wherein said declogging means include a decompression platform resiliently mounted in said hopper and means for vibrating said platform when actuated by said sensing means.

6. A silo according to claim 1, including at least one movable closure member for varying the effective area of a control section through which material passes after leaving said hopper.

7. A silo according to claim 6, wherein the pressure of the material on the conveyor is representative of the material flow condition through said outlet opening, and including sensing means responsive to said pressure on the conveyor portion beneath said hopper for controlling said closure member.

8. A silo according to claim 6, wherein said closure member includes a horizontally displaceable register.

9. A silo according to claim 1, characterized in that said silo body includes a plurality of outlet openings, a hopper beneath each of said openings, each hopper being spaced above said conveyor by a distance greater than the distance between said conveyor and the hopper immediately preceding it with respect to the direction of movement of material by said conveyor, declogging means for each hopper, sensing means responsive to the slope corresponding to the respective hopper, for controlling its respective declogging means, and an adjustable sill for controlling the height of the material moving along the conveyor from each hopper.

* * * * *